(12) United States Patent
Katabami et al.

(10) Patent No.: US 8,541,089 B2
(45) Date of Patent: Sep. 24, 2013

(54) FIXING BELT, BASE ELEMENT FOR FIXING BELT, FIXING DEVICE, IMAGE FORMING APPARATUS AND METHOD FOR PRODUCING BASE ELEMENT

(75) Inventors: Hiroshi Katabami, Chigasaki (JP); Minoru Matsuo, Sagamihara (JP); Shigenobu Fukui, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 752 days.

(21) Appl. No.: 11/828,645

(22) Filed: Jul. 26, 2007

(65) Prior Publication Data

US 2008/0026208 A1 Jan. 31, 2008

(30) Foreign Application Priority Data

Jul. 26, 2006 (JP) .................................. 2006-203352
Feb. 26, 2007 (JP) .................................. 2007-045349

(51) Int. Cl.
*B29D 29/10* (2006.01)
*F16G 1/06* (2006.01)

(52) U.S. Cl.
USPC ............. 428/64.4; 428/57; 428/58; 428/64.2; 156/137

(58) Field of Classification Search
USPC ................... 428/64.4, 57, 58, 64.2; 156/130
See application file for complete search history.

(56) References Cited

U.S. PATENT DOCUMENTS

| 5,225,852 | A * | 7/1993 | Uchida et al. ................. 346/134 |
| 6,505,028 | B1 * | 1/2003 | Yoda et al. ..................... 399/329 |
| 2004/0224165 | A1 * | 11/2004 | Kondoh et al. ............... 428/422 |
| 2006/0067747 | A1 | 3/2006 | Matsuda et al. |

FOREIGN PATENT DOCUMENTS

| CN | 1752864 | 3/2006 |
| JP | 64-1532 | 1/1989 |
| JP | 3-16233 | 2/1991 |
| JP | 3-25471 | 2/1991 |
| JP | 4-303854 | 10/1992 |
| JP | 5-185519 | 7/1993 |
| JP | 6-15740 | 1/1994 |
| JP | 6-307648 | 11/1994 |
| JP | 10-698 | 1/1998 |
| JP | 10-305500 | 11/1998 |
| JP | 11-235765 | 8/1999 |
| JP | 2000-147928 | 5/2000 |
| JP | 2001-60050 | 3/2001 |
| JP | 2001-117396 | 4/2001 |
| JP | 2001-125404 | 5/2001 |
| JP | 2001-142325 | 5/2001 |
| JP | 2001-290384 | 10/2001 |
| JP | 2002-172627 | 6/2002 |

(Continued)

OTHER PUBLICATIONS

Translation of JP 2004-070191A (Okaysu).*

(Continued)

*Primary Examiner* — Brent O'Hern
(74) *Attorney, Agent, or Firm* — Oblon, Spivak, McClelland, Maier & Neustadt, L.L.P.

(57) ABSTRACT

A base element for a fixing belt are provided. The base element includes a sheet which is made of a heat resistant resin and has opposite end portions joined in an endless state. A conductive film layer of a thickness of 3 to 15 μm is provided over two third or more area of an inner surface of the endless belt.

20 Claims, 8 Drawing Sheets

(56) References Cited

FOREIGN PATENT DOCUMENTS

| | | |
|---|---|---|
| JP | 2002-172635 | 6/2002 |
| JP | 2003-43863 | 2/2003 |
| JP | 2003-140486 | 5/2003 |
| JP | 3433594 | 5/2003 |
| JP | 2003-263046 | 9/2003 |
| JP | 2003-316192 | 11/2003 |
| JP | 2004-70191 | 3/2004 |
| JP | 2004-86202 | 3/2004 |
| JP | 2004-138857 | 5/2004 |
| JP | 2004-138858 | 5/2004 |
| JP | 2004-138859 | 5/2004 |
| JP | 2004-148706 | 5/2004 |
| JP | 2004-151260 | 5/2004 |
| JP | 2004-181291 | 7/2004 |
| JP | 2004-198969 | 7/2004 |
| JP | 2004-286084 | 10/2004 |
| JP | 2005-14417 | 1/2005 |
| JP | 2005-62662 | 3/2005 |
| JP | 2005-84294 | 3/2005 |
| JP | 2005-288919 | 10/2005 |
| JP | 2006-16592 | 1/2006 |

OTHER PUBLICATIONS

Translation of JP 06-015740A (Yoneda).*
Office Action issued Oct. 27, 2011, in European Patent Application No. 07 113 188.2.
Office Action issued on Jul. 10, 2012, in Japanese patent Application No. 2007-045349.

* cited by examiner

FIXING BELT, BASE ELEMENT FOR FIXING BELT, FIXING DEVICE, IMAGE FORMING APPARATUS AND METHOD FOR PRODUCING BASE ELEMENT

CROSS REFERENCE TO RELATED APPLICATIONS

This application is based on and claims priority from each of Japanese Patent Application Nos. 2006-203352, filed on Jul. 26, 2006 and 2007-045349, filed on Feb. 26, 2007, the disclosure of which is incorporated herein by reference in its entirety.

BACKGROUND OF THE INVENTION

1. Field of the Invention

The present invention relates to a fixing belt used in an image forming apparatus such as an electrophotographic copier, a laser printer, facsimile or the like, a base element for the fixing belt and an image forming apparatus having the fixing belt. The present invention also relates to a method for producing the base element.

2. Description of the Related Art

FIG. 5 illustrates an explanatory view of a conventional image forming apparatus in an electrophotographic system. The conventional image forming apparatus 100 in the electrophotographic system, for example, a copying machine or a laser printer includes a photoconductor drum 101 on which an electrostatic latent image is formed, a charging roller 102 which is in contact with the photoconductor drum 101 to perform a charging process, an exposure device 103 such as a laser beam or the like, a development roller 104 which applies toner onto the electrostatic latent image formed on the photoconductor drum 101, a power pack 105 which applies a DC voltage to the charging roller 102, a transfer roller 106 which transfers a toner image formed on the photoconductor drum 101 onto a recording paper 107, a cleaning device 108 which cleans the photoconductor drum 101 after the transfer process, a surface potentiometer 109 which measures a surface potential of the photoconductor drum 101, and a thermal fixing device 110 which includes a thermal fixing roller 111 and a pressure roller 112.

In the image forming apparatus 100 using the electrophotographic system, a photoconductor layer of the rotating photoconductor drum 101 is uniformly charged by use of the charging roller 102, and then the photoconductor layer is exposed by the exposure device 103 such as a laser beam or the like to form the electrostatic latent image. The toner image is formed by developing the electrostatic latent image with the toner and then transferring it to the recording paper 107. The recording paper 107 is passed through the thermal fixing device 110 including the thermal fixing roller 111 and the pressure roller 112 so that the toner image is fixed by heat.

In the above-mentioned thermal fixing device of the image forming apparatus 100, for example, the thermal fixing roller 111 having a cored bar of a hollow cylindrical body made of aluminum or the like is provided with a separation layer of a fluorine resin or the like on an external surface of the cored bar to prevent the toner from being adhered thereon. A heater such as a halogen lamp or the like is disposed along a rotating center line in the hollow portion of the cored bar 80 that the thermal fixing roller 111 is heated from an inner side thereof by radiation heat of the heater. The recording paper 107 is passed between the thermal fixing roller 111 and the pressure roller 112 so that the toner attached on the recording paper is pressed and fixed thereon while being softened by the heat of the thermal fixing roller 111.

Although the thermal fixing roller 111 provided with the fluorine resin layer on the cored bar has good detachability, because of being less flexible and less elastic, the thermal fixing roller 111 cannot be applied to an image forming apparatus such as a full-color copying machine involving a glossed image, a full-color laser printer or the like. For the image forming apparatus such as a conventional full-color copying machine, the laser printer or the like, four color toners of red (magenta), blue (cyan), yellow and black are used and transferred on a paper surface in a superimposed state. Consequently, when the color toners in an unstable state are fixed, it is necessary that the toners be enveloped with a surface of the thermal fixing roller to allow the toners to be uniformly mixed in a melting condition. Therefore, flexibility is required for the surface property of the fixing member (roller, belt).

Conventionally, in order to provide the flexibility on the surface of the fixing roller, an elastic layer is provided on the fixing roller. The elastic layer such as a silicon rubber, a fluorine rubber or the like is provided on a silicon rubber roller, that is to say, a rubber material, that is to say, the elastic layer is made of a rubber material which has greater detachability and durability than that of a rubber material of the base rubber roller. However, in the fixing roller with the above-mentioned elastic layer, a thickness of the elastic layer is limited within a certain constant value to prevent a long warming up time. Since the thermal fixing roller allows a temperature thereof to be maintained at a desirable temperature and has a large heat capacity, it is suitable for speeding up fixing. However, since it takes a long time to heat the thermal fixing roller up to the desirable temperature, there is a problem in that a large power consumption is required.

Recently, in the field of image processing, methods of saving energy have been developed. As a result, in particular, the fixing device in a fixing belt type electrophotographic device has been used for fixing the color toner image with heat. That is to say, a fixing roller 5 is mounted on a fixing belt 1, and the fixing belt 1 is held and pressed by the fixing roller 5 and a pressure roller 6, as shown in FIG. 6. A transferred paper 8 is passed between the fixing belt 1 and pressure roller 6 to allow the toner on the transferred paper to be fixed as shown in FIG. 6. Moreover, a heating roller 2 is disposed on an end portion of the fixing belt 1, and a heater 3 such as a halogen lamp is disposed along a rotating center line in a hollow portion of the heating roller 2. The heating roller 2 is heated from an inner side by radiation heat of the heater 3 to transfer the heat to the fixing belt 1 via the heating roller 2.

Reference number 4 in FIG. 6 indicates a thermistor which measures a surface temperature of the heating roller 2 and turns on the halogen lamp 3 depending on the temperature. A tension roller 7 is disposed on the fixing belt 1 to prevent an occurrence of deflection when the fixing belt 1 is rotated.

FIG. 6B illustrates the fixing belt 1 including an endless belt 10 of a heat-resistant resin such as a polyimide or the like, an elastic layer 11 of a silicon rubber or the like, which is provided on an external surface of the endless belt 10, and a separation layer 12 of a fluorine resin, which is provided on a surface of the elastic layer 11 to prevent the toners from being adhered.

Since the fluorine resin layer as the separation layer is required to be provided on a surface of a base element, a polyimide resin as a heat-resistant resin which does not change at a melting temperature range of the fluorine resin, that is to say, 320 to 360° C. is preferably used for the base element.

A usual method for producing an endless belt from a polyimide resin includes applying a polyimide precursor solution on an inner surface of a cylindrical die made of a metal, drying the polyimide precursor solution by heating the cylindrical die from outside while rotating, then heating at 300° C. for several hours to harden and form a film, and removing the film from the die so that the endless belt is obtained.

In the above-mentioned fixing device in the fixing belt type electrophotographic device, the fixing belt is charged due to friction occurring when a transferred paper passes between the fixing belt and the pressure roller, so that a disadvantage such as an electrostatic off-set occurs. To prevent this charging due to the friction, Japanese Patent Laid-Open Publication Number Hei10-305500 discloses a technique of laminating a conductive silicon rubber which has a surface resistance of $10^5$ to $10^{12} \Omega/\square$ on an external surface of a tubular fixing belt made of a conductive polyimide resin which has a surface resistance of $10^1$ to $10^8 \Omega/\square$. Furthermore, Japanese Patent Laid-Open Publication Number Hei11-235765 discloses a method for producing a polyimide belt which is formed on an inner surface of the cylindrical die as mentioned above. The endless polyimide belt is formed from two layers including an insulation layer and a conductive layer which is disposed on an inner surface of the endless belt.

However, since a large number of dies are required and the inner surface of the die is required to be smoothed uniformly in order to allow the obtained endless belt to be separated from the die, these techniques involve high cost because of the dies.

Since the above-mentioned fixing device includes an expensive fixing belt, there is a need to decrease the production cost of the fixing belt.

As a method for producing a fixing belt at a comparably low cost, Japanese Patent Laid-Open Publication Number Hei05-185519 discloses a technique in which stepped portions are formed on opposite end portions of a heat-resistant film by a half-etching process with a UV laser. The opposite stepped portions are joined with a heat-resistant adhesive to form an endless belt. However, the technique does not achieve a charging prevention effect if the technique is applied to the fixing belt.

SUMMARY OF THE INVENTION

An object of the present invention is to provide a fixing belt which is easily produced at a low cost and has a charging prevention effect, a base element used for producing the fixing belt and a method for producing the base element.

To achieve the above object, a base element for a fixing belt according to an embodiment of the present invention includes a sheet which is made of a heat-resistant resin and has opposite end portions joined in an endless state. A conductive film layer of a thickness of 3 to 15 μm is provided over an area of two thirds or more of an inner surface of the endless belt.

BRIEF DESCRIPTION OF THE DRAWINGS

FIGS. 1A to 1G are views showing processes for forming a thinned portion in an example of a method for producing a base element of a fixing belt according to the present invention, wherein FIG. 1A is a view showing a state where a sheet α for a belt of a desirable size is cut from a polyimide sheet roll, FIG. 1B is a view showing a sheet α for the belt, FIG. 1C is a sectional view showing positions where thinned portions α21 are provided, FIG. 1D is an explanatory view showing a method for providing the thinned portions α21, FIG. 1E is a sectional view showing a state where the thinned portions α21 are provided, FIG. 1F is an explanatory view showing a method for providing a thinned portion in a tapered shape, and FIG. 1G is a sectional view showing a state where the thinned portions in a tapered shape are provided.

FIGS. 2A to 2C are views showing processes for providing a conductive film in an example of a method for producing a base element of a fixing belt according to the present invention, wherein FIG. 2A is a sectional view showing a state where a conductive film is provided, FIG. 2B is a perspective view showing an example of a method for providing a conductive film using an application device, and FIG. 2C is a perspective view showing a range where a conductive film layer is provided.

FIGS. 3A to 3C are views showing processes for applying an adhesive to a surface of the thinned portion to be joined in an example of a method for producing a base element of a fixing belt according to the present invention, wherein FIG. 3A is a perspective view showing a device in a screen printing method, FIG. 3B is a sectional view showing a state where an adhesive is applied, and FIG. 3C is a top view showing a state where the adhesive is applied.

FIGS. 4A to 4G are views showing processes for joining and finishing in an example of a method for producing a base element of a fixing belt according to the present invention, wherein FIG. 4A is a perspective view showing a joining device, FIG. 4B is a sectional view in a plane perpendicular to a longitudinal direction of the joining device, FIG. 4C is a top view showing a state where the sheet a of the belt is set on a base member, FIG. 4D is a top view showing a state where opposite surfaces of the thinned portions α21 of the sheet a of the belt to be joined are pasted together, FIG. 4E is a perspective view showing a state where the joining device is put in a thermostatic chamber for a heat treatment, FIG. 4F is a perspective view showing a base element of the belt in a state where the thinned portions α21 are joined, and FIG. 4G is a perspective view showing a base element finished in a desirable size.

FIGS. 6A and 6B are views showing a fixing device of a fixing belt type electrophotographic device, wherein FIG. 6A is a view showing the entire fixing device, and FIG. 6B is a view showing a structure of the fixing belt.

DETAILED DESCRIPTION OF THE PREFERRED EMBODIMENTS

Figure 1A:
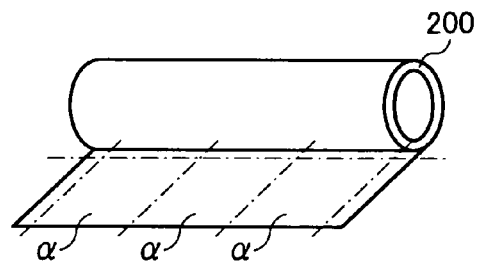

Preferred embodiments of the present invention will be explained in detail with reference to the accompanying drawings below.

A base element according to one embodiment of the present invention is applied to a fixing belt used, for example, in an image forming apparatus.

The base element has a sheet which is made of a heat-resistant resin and has opposite end portions joined in an endless state, in which a conductive film layer of a thickness of 3 to 15 μm is provided over an area of two thirds or more of an inner surface of the sheet.

In the illustrated embodiments, the term "sheet" indicates an object in a sheet-like shape, that is to say, the sheet may be a thin object or a so-called film.

The base element requires a sheet to be used as a raw material. If an endless belt formed in a cylindrical shape is used instead of the sheet, advantageous effects of the present invention are not provided because a high-accuracy and expensive die are required for producing the belt, causing high cost for producing the base element.

It is necessary that the sheet be made of a heat-resistant resin, particularly polyimide, so that sufficient heat resistance of an elastic layer of a silicon rubber, a fluorine rubber or the like to produce a fixing belt can be obtained.

The used polyimide sheet is in a thickness of 50 μm to 125 μm as used for a conventional fixing belt. If the thickness of the sheet is more than 125 μm, lack of flexibility occurs and if it is less than 50 μm, lack of strength of the fixing belt occurs so that less durability of the fixing belt is provided.

The above polyimide sheet is cut to form a sheet so that a fixing belt in a desirable shape can be obtained, and then thinned portions are provided on opposite surfaces of opposite end portions of the sheet.

Each of the thinned portions may be formed in a stepped shape or a tapered shape. In the latter case, the opposite end portions may be processed such that the thickness of the thinned portion is gradually thinned approaching an end of the sheet. Since the tapered thinned portion is continuously thinned, breakage of the fixing belt at the thinned portion can be prevented unlike in the former case where the fixing belt is broken at a stepped portion. That is to say, the stepped thinned portions formed by a cutting process can be prevented from leading to bending or reduction of the durability of the fixing belt due to a local stress concentration, which may occur in the former case.

It is preferable that a low-cost grinding process by a grinding machine be performed to form the above thinned portion, instead of a high-cost half-etching process with a UV laser. It is possible to form the stepped thinned portion by cutting with an end milling using a general-use milling machine. In this case, a variation of the thickness is greater than that in the case of the grinding process; however, it is advantageous that the cutting process be performed in a short time.

As a method for forming the thinned portion by the milling machine, the following methods are proposed:

A sheet α in a desired size is prepared from a roll-shaped polyimide sheet as shown in FIG. 1A. A thinned portion α21 in a stepped shape as schematically shown in FIG. 1E can be easily provided on each of both end portions α2 of the sheet α fixed on a sheet-fixation base member 210 with adhesive tapes or the like by down-cutting a part of each of the both end portions α2 (see FIGS. 1B and 1C), for example, with an end milling 211 of a milling machine as shown in FIG. 1D.

Figure 1B:
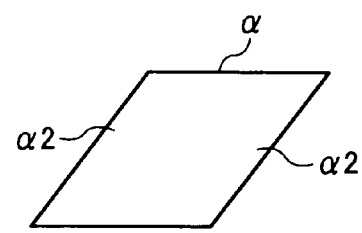
Figure 1C:
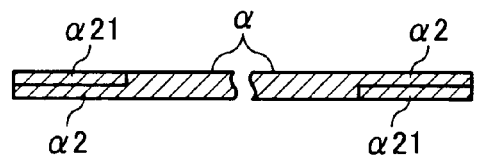
Figure 1D:
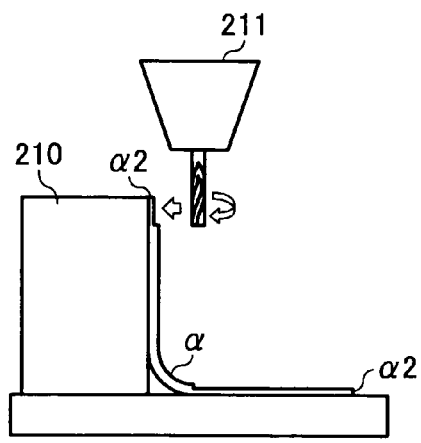
Figure 1E:
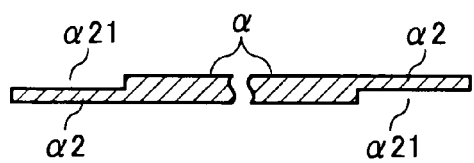
Figure 1F:
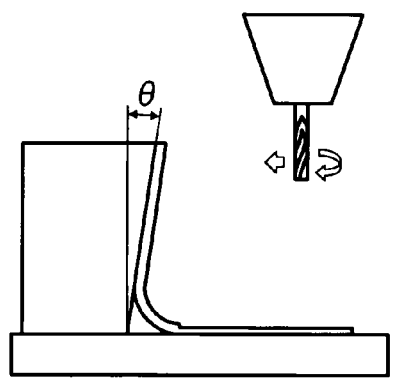
Figure 1G:
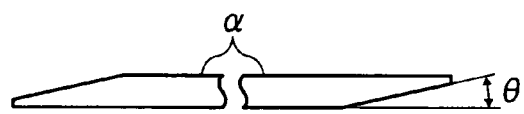

On the other hand, in the case that each of the thinned portions α21 is to be formed in a tapered shape, each of the thinned portions α21 is processed using a sheet-fixation base member which has an inclined surface with an angle θ in relation to an axial direction of a drill 211 as shown in FIG. 1F. The above process makes it possible to provide easily the thinned portions α21 in a tapered shape of the angle α as schematically shown in FIG. 1G.

Figure 2A:
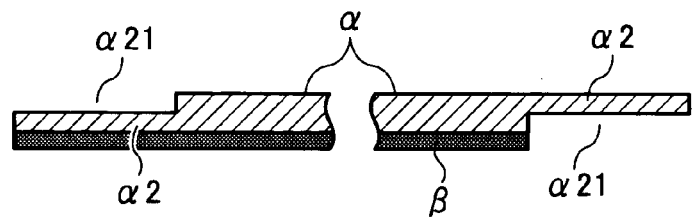

After the above-mentioned sheet provided with the thinned portions α21 is obtained, a conductive film schematically shown as β in FIG. 2A is formed on one side of the sheet.

Since the conductive film is formed on the sheet, an electrostatic charge is prevented from occurring so that fixing of high-quality images can be achieved without defects being caused.

The above-mentioned conductive film is preferably formed from a material including a polyimide, a polyphenylene sulfide (PPS), and a conductive carbon. Since PPS resin has excellent heat-resistant property and polyphenylene molecules enter between polyimide molecules which have a water-absorbing property, the material can have a low water-absorbing property. Therefore, since the conductive film has a low water-absorbing property when it is not used, the conductive film can be effectively adhered on the sheet (made of polyimide) so that the fixing belt can achieve long-lasting qualities.

The above-mentioned conductive film-material can be particularly obtained by mixing a suitable volatile liquid, for example, water with a polyimide precursor in powder form, which is not completely hardened (that is to say, an incompletely hardened polyimide or polyimide precursor), a polyphenylene sulfide in powder form, and a conductive carbon in powder form (for example, having a particle diameter of about 20 μm).

The composition of the polyimide is preferably between 30 and 50 weight % of the dry conductive film-material so that the film has sufficient durability. The composition of the polyphenylene sulfide is preferably between 5 and 20 weight % so that a sufficient effect of addition of the polyphenylene sulfide and the durability of the film are achieved. The composition of the conductive carbon is adjustable depending on a required conductivity, and generally between 5 and 40 weight %. In addition, another component, for example, a whisker or the like may be included in the conductive film-material, for example, in order to enhance the durability of the film.

In the application process of the material, a thickness of the conductive film layer to be obtained is required to be between 3 to 15 μm. If the thickness of the conductive film layer is less than 3 μm, the conductive layer can be subjected to problems in that a sufficient charge prevention effect cannot be achieved, that lack of the durability occurs, or the like. If the thickness of the conductive film layer is more than 15 μm, there are problems in that cracks causing low durability are easily generated, and that the conductivity of the film is decreased.

Figure 2B:
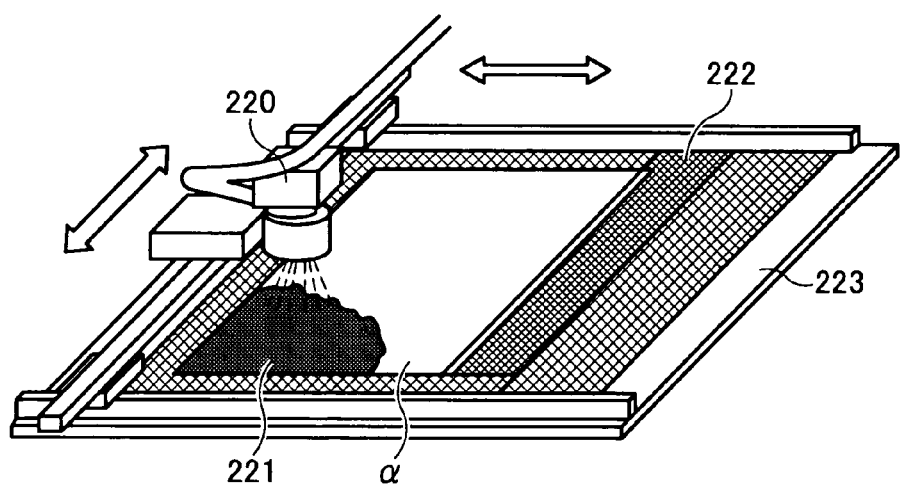

FIG. 2B illustrates an example of an applicator for applying the material, which is used for forming the conductive film on the sheet α of the belt. The conductive film is formed using the applicator, for example, as follows.

A masking tape 222 is disposed on the sheet along an edge of the thinned portion α21 to protect the thinned portions α21 so that an attachment of the material to the thinned portions α21 for joining is avoided. The cut polyimide sheet α is disposed on a wire-mesh frame 223 of the applicator, and then one side of the polyimide sheet is sprayed over with the conductive material by a spray gun 220. The spray gun 220 is disposed so as to be movable in X-Y (crosswise and lengthwise) directions of the sheet α, and applies the material to the sheet α while moving such that the material is uniformly applied. After the conductive material 221 is dried following the application process, the masking tape 222 is removed.

Figure 2C:
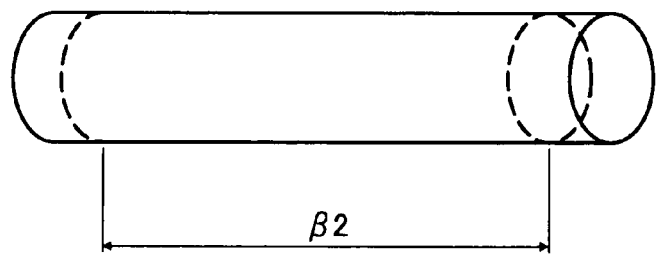

The conductive film layer is used for a fixing belt to prevent a charge being generated when a transferred paper passes through a surface of the fixing belt. Therefore, the conductive film layer is preferably formed on an inner surface of the belt in an area corresponding to a paper-passing area (β2) in which the transferred paper passes as schematically shown in FIG. 2C.

Furthermore, the conductive film layer is required to be provided over an area of two thirds or more of the inner surface of the belt. If the conductive film is provided over an area less than two thirds of the inner surface of the belt, it may fail to provide the charge-prevention effect. In addition, if the conductive film layer is not fully provided over all the area of the inner surface of the belt, that is to say, for example, it is provided over two thirds of the inner surface of the belt, the conductive film layer is required to be uniformly provided over all the area of the inner surface. For example, the conductive film layer may be provided in a striped shape parallel to a rotational direction of the belt, or in a bias striped shape inclined to the rotational direction. These conductive film layers can be easily formed by masking in a forming process of the conductive film layer.

An elastic layer including a silicon rubber, a fluorine rubber, or the like is formed on the base element to form a fixing belt. The polyimide is hardened by performing a heat treatment after forming the conductive film layer or when forming the elastic layer.

Prior to forming the conductive film, it is possible that an adhesive layer is formed or a primer treatment is performed on a surface of the sheet to be provided with the conductive film in order to enhance adhesiveness between the conductive film and the surface of the sheet to be provided with the conductive film.

FIGS. 3A to 3D and 4A to 4G illustrate processes for forming an endless belt from the sheet-like base element.

Figure 3A:
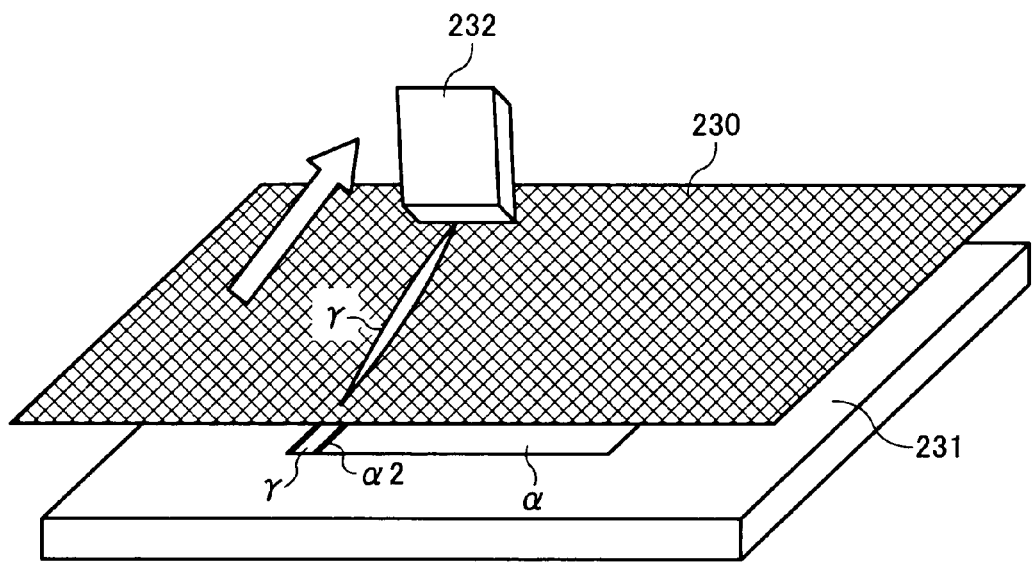

An adhesive, for example, a silicon adhesive γ is applied to one or both areas of the thinned portions α21 of the sheet-like base element to join the opposite end portions of the sheet-like base element. The silicon adhesive γ which has a sufficient heat resistance even in the forming process of the elastic layer generally has a viscosity between 10 to 100 pa s. Therefore, the silicon adhesive γ is applied by a screen printing method, as shown in FIG. 3A. That is to say, the silicon adhesive γ is applied on a screen plate 230, and then rubbed while being compressed on the area of the thinned portion α21 of the polyimide sheet by a squeegee 232 to penetrate the screen plate 230 so that the silicon adhesive γ is applied to the area.

Figure 3B:
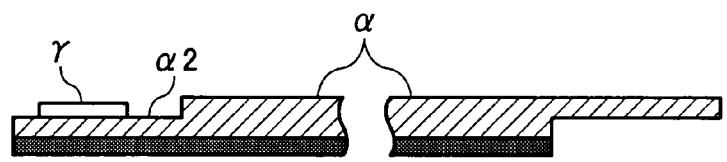
Figure 3C:
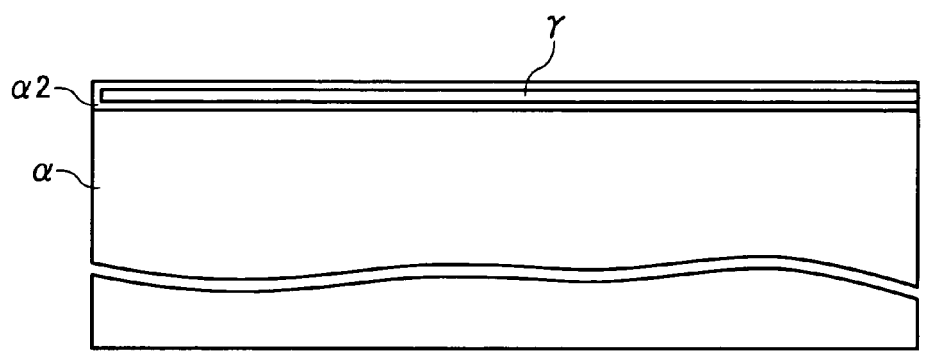

The screen plate 230 is preliminarily masked such that a masked area of the screen plate 230 is matched to the area of the thinned portion α21, thereby the application of the adhesive γ is avoided in the masked area where the adhesive γ is not required to be applied (see FIG. 3B and FIG. 3C). The adhesive may be applied to either only one or both of the areas of the thinned portions α21 to be joined.

Although the adhesive has a high viscosity in the above-explained example, the adhesive may have a low viscosity (for example, less than 10 pa s), and may be applied by a syringe method or the like, that is to say, may be applied using a syringe filled with the adhesive.

Figure 4A:
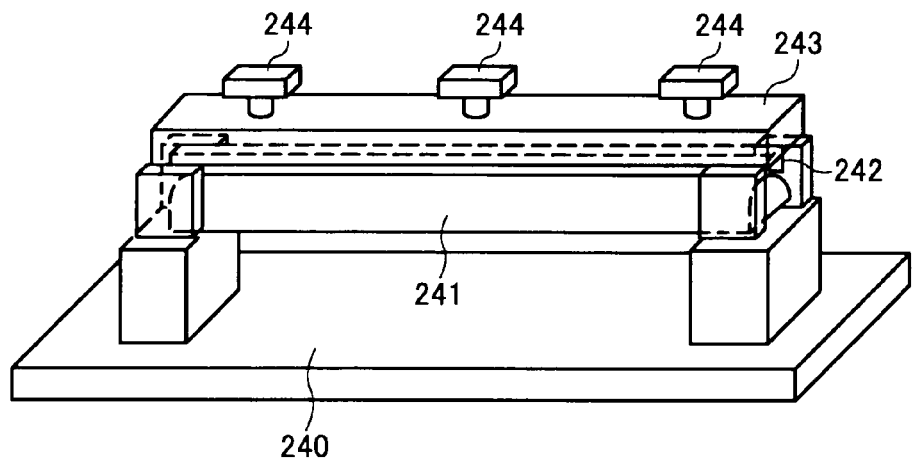
Figure 4B:
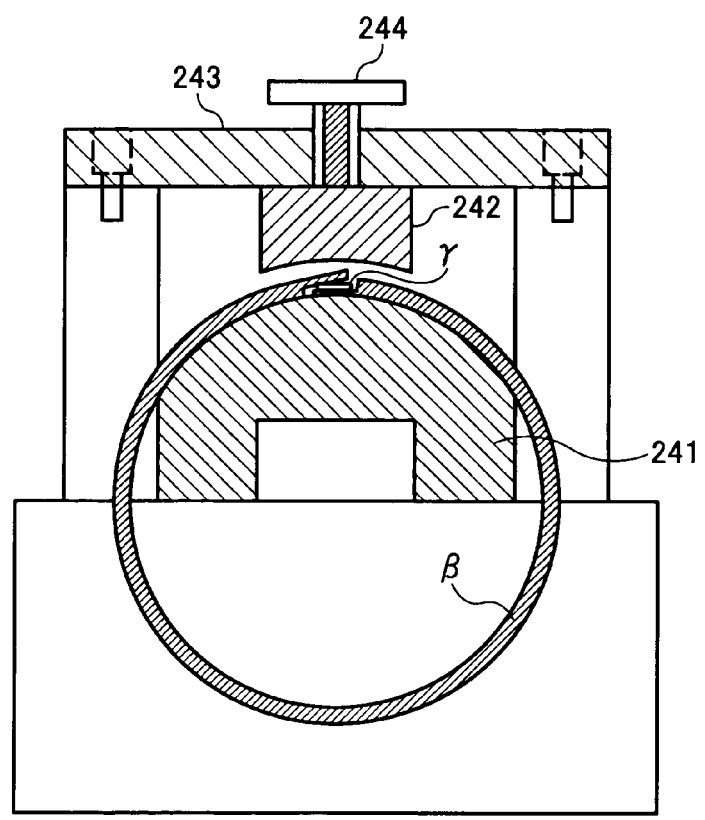
Figure 4C:
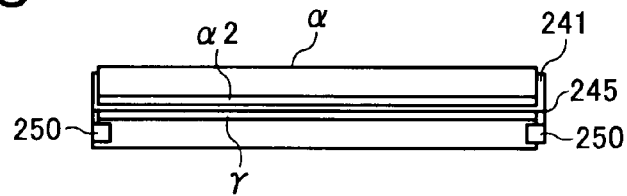
Figure 4D:
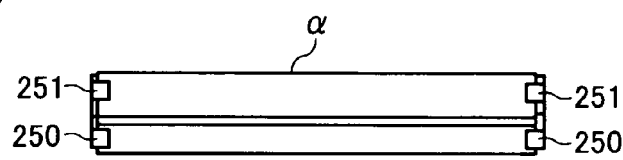

Thus, the adhesive is applied on the at least one area of the thinned portions α21 to be joined and the thinned portions α21 are joined to each other. In the application of the adhesive, for example, a joining device 240 is used to join the thinned portions α21 as shown in FIG. 4A. FIG. 4B shows a cross-sectional surface perpendicular to a longitudinal direction of the joining device. FIG. 4C is a top view of the joining device 240 in a state where the polyimide sheet α provided with the conductive film β is set, and FIG. 4D is a top view of the joining device in a state where the polyimide sheet α is set and the areas to be joined are overlapped.

A top line 245 which is parallel to an axis direction of the base member 241 is preliminarily provided on a base member 241 having a gentle cylindrical convex surface to determine a position to which the sheet is set. The sheet α is set such that one end portion of the polyimide sheet α, which is provided with the adhesive γ, is matched to the top line. The area of the thinned portion α2 of the one end portion to be joined is fixed on the base member 241 by adhesive tapes 250 (see FIG. 4C) to avoid a displacement of the sheet α. Then, the polyimide sheet α is wrapped around the base member 241, the area of the thinned portion α2 of the one end portion to be joined is overlapped with the area of the thinned portion α2 of the other end portion to be joined, and the area of the thinned portion α2 of the other end portion to be joined is fixed on the base member 241 by adhesive tapes 251.

As mentioned above, the area of the thinned portion α2 of the other end portion to be joined, which is fixed on the base member 241, is pressed from above by a fixation plate 242 having a concave surface corresponding to the convex surface of the base member 241. A pressure applied by the fixation plate 242 is adjusted by tightening of a pusher bolt 244 provided on a frame 243 which is provided on an upper side of the fixation plate 242 such that the pressure is controlled in a suitable range.

Figure 4E:
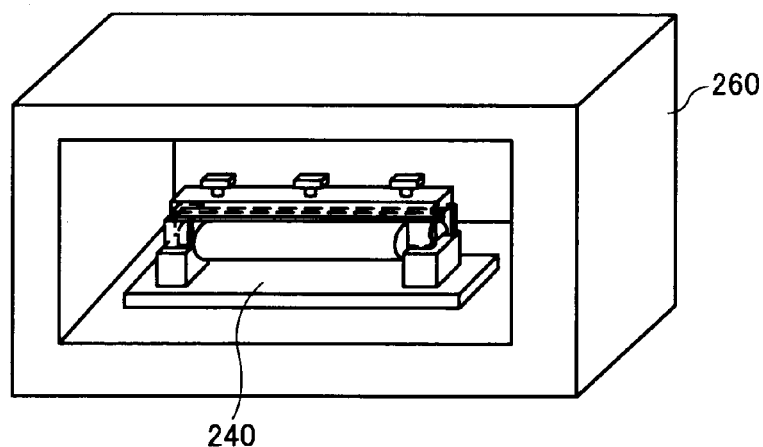
Figure 4F:
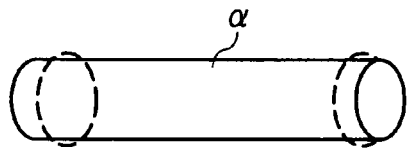
Figure 4G:
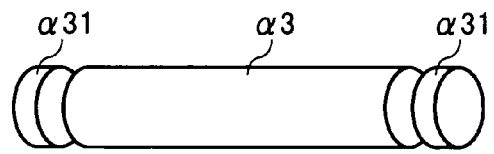
Figure 5:
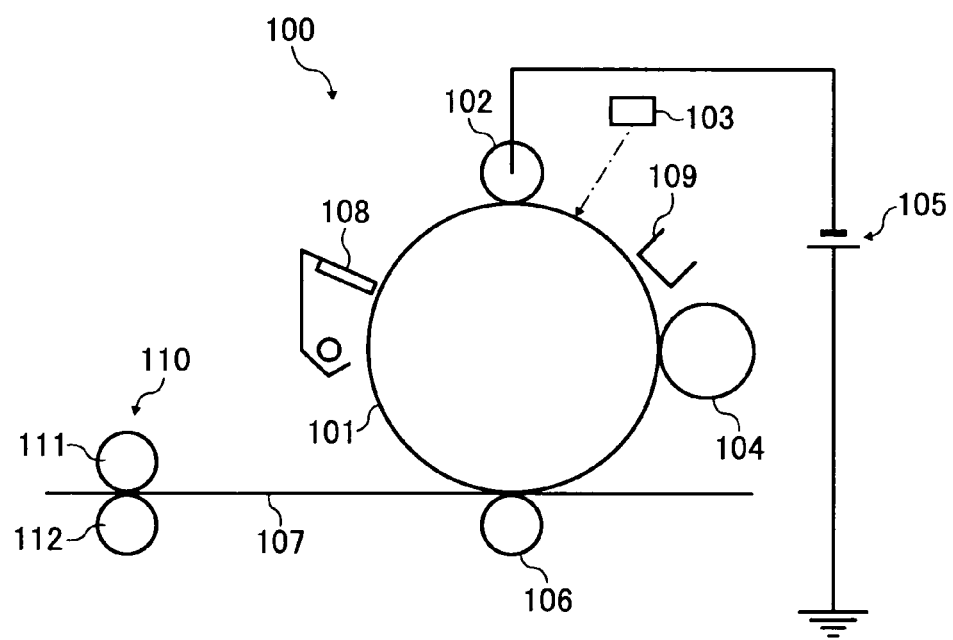
FIG. 5 is an explanatory view showing an image forming apparatus in a conventional electrophotographic system.
Figure 6A:
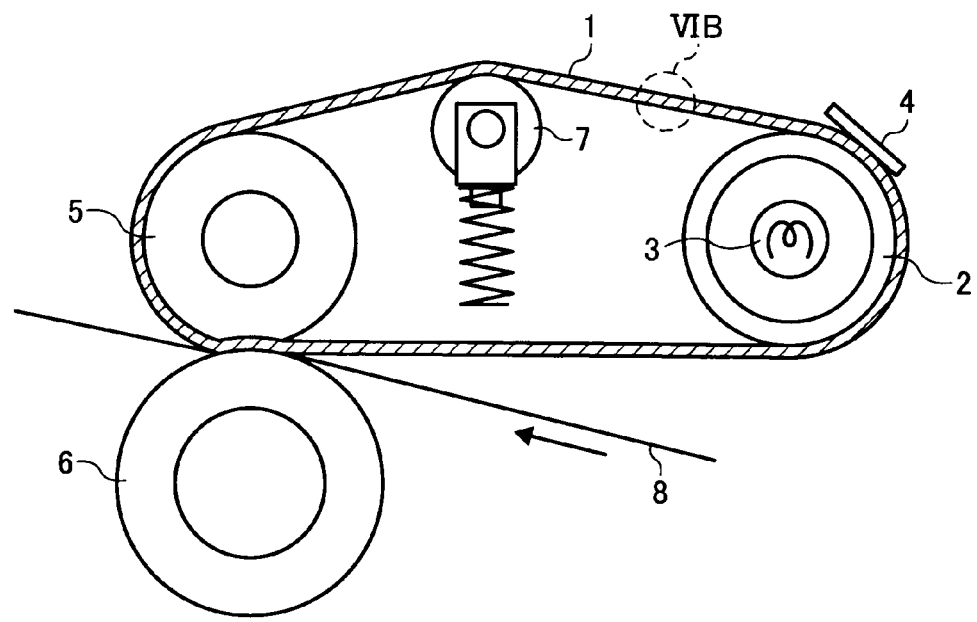
Figure 6B:
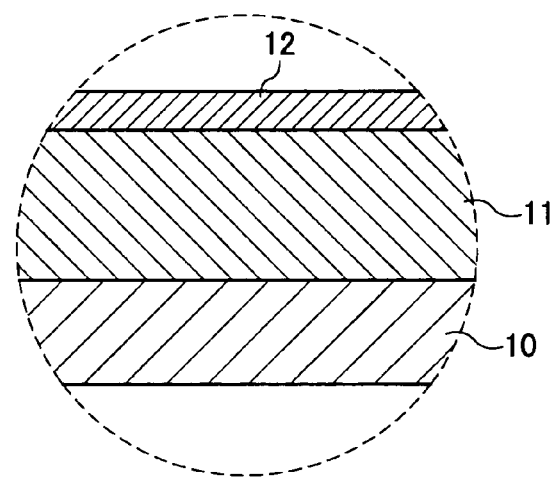

The joining device 240 in which the polyimide sheet α in a state where the areas to be joined are pressed and adhered to each other is set is inserted in a thermostatic chamber 260 in which the temperature is kept at, for example, 150° C. as shown in FIG. 4E. The heat treatment is performed, for example, for 30 minutes so that the adhesive is hardened to form an endless belt (see FIG. 4F). Then, the sheet α is removed from the joining device 240 and unnecessary opposite end parts α31 are cut 80 that the base element α3 in a desirable size is obtained, as shown in FIG. 4G.

A fixing belt is obtained by performing generally required processes mentioned below on to the base element after the joining process. For example, an elastic layer is formed on the base element from a silicon rubber or the like, after a primer treatment or an application of a primer for the elastic layer is performed according to need. Then, a fluorine resin material is applied after a primer treatment or an application of a primer for the fluorine resin material is performed according to need, and a separation layer is formed by a heat treatment so that the fixing belt is obtained. Furthermore, treatments for end portions or mechanical processes may be performed.

As mentioned above, the method for producing the base element, has the steps of preparing the sheet which is made of a heat-resistant resin, particularly the polyimide, applying the conductive film-material to the surface of the sheet, and joining the opposite end portions of the sheet to form the endless belt so that the surface provided with the conductive film-material is disposed on an inner side of the endless belt. However, the base element may be produced by joining the opposite end portions of the sheet to form the endless belt, and applying a conductive film-material to the inner surface of the endless belt while rotating the endless belt. In this case, for example, while the tubular endless belt is rolled and rotated on a flat surface or a curved surface, the conductive film-material is supplied by a nozzle on the inner surface of the endless belt. Then the endless belt is further rotated so that the thickness of the conductive film-material is uniform, and the conductive film is obtained, for example, by drying the conductive film-material while the endless belt is rotated. By performing the heat treatment after the formation of the conductive film or when forming the elastic layer of the silicon rubber or the like, the hardening of the polyimide is completed. In this case, since the conductive film is formed after the opposite end portions of the sheet are joined, the masking of the thinned portions when applying the conductive film-material is not required.

If the thinned portions are formed on the sheet provided with the conductive film layer, a processing accuracy for forming the thinned portions to be joined becomes less so that the fixing belt has low durability. Therefore, the base element of the fixing belt is required to be produced by the above-mentioned two methods.

Examples

As mentioned below, embodiments of the present invention are described. However, the present invention is not limited to the embodiments.

[Fixing Belt A1]

In order to form finally a cylindrical body as a belt having a length of 320 mm and an external diameter of 60 mm, a polyimide film (Kapton®, 300H, DU PONT-TORAY CO., LTD.) having a thickness of 75 μm was cut so that a sheet was obtained (see FIG. 1B). The thinned portion α21 was formed on each of opposite surfaces of the opposite end portions α2 (a length of 340 mm) of the sheet α to be joined by grinding such that the thickness of the thinned portion α21 was 35 μm in a range of 10 mm from each of opposite ends of the sheet (see FIGS. 1C to 1E).

A conductive film-material was applied to the sheet as follows. A material having a solid content of a polyimide precursor of 40 weight %, a polyphenylene sulfide of 30 weight %, and a conductive carbon (powder) of 30 weight % was dispersed in water such that it had a viscosity of 400 cps to prepare the conductive film-material. The prepared conductive film-material was sprayed by a spray gun on an entire surface of one side of the sheet α having the opposite end portions provided with the thinned portions α21 except parts provided with the thinned portions α21 such that the thickness of the conductive film-material was finally 5 μm (see FIG. 2B). Then, the sheet was dried at 150° C. to form the conductive film β (see FIG. 2A).

A silicon adhesive (TSE387, GE Toshiba Silicone Co., Ltd.) was applied to areas of the two thinned portions α21 to be joined (see FIGS. 3A to 3C). After the areas of the thinned portions α21 to be joined were pasted to each other using the joining device 240 (see FIGS. 4A to 4D), the areas were joined by heating at 250° C. under pressure (see FIG. 4E), and then the sheet was cut to a desirable size so that a base element α3 according to an embodiment of the present invention (see FIGS. 4E and 4F) was obtained.

A typical primer for a silicon rubber (DY39-051, TORAY Co., LTD.) used for producing a fixing belt was sprayed by a spray gun on an external surface of the base element of the polyimide. Then a liquid silicon rubber (DX35-2120, TORAY Co., LTD.) commonly used for producing a fixing belt was sprayed by a spray gun such that the thickness of the primer was finally 200 μm. After heating the base element provided with the silicon rubber at 150° C. for 30 minutes, the silicon rubber layer (elastic layer) was formed by performing a secondary vulcanization by heating at 200° C. for 4 hours.

A typical primer for a fluorine resin (PR920BN, DuPont-Mitsui Fluorochemicals Co., Ltd.) used for producing a fixing belt was applied to the elastic layer. A fluorine resin material (MP102, DuPont-Mitsui Fluorochemicals Co., Ltd.) commonly used for producing a fixing belt was sprayed on a surface of the elastic layer provided with the fluorine primer. Then, a separation layer (thickness of 20 μm) was formed by heating at 340° C. for 30 minutes so that the fixing belt A1 (embodiment 1) was obtained. In addition, the above heating process at 340° C. made it possible for a polyimidization of the conductive film layer B to be completed.

[Fixing Belt A2]

A fixing belt A2 (comparative example 1) configured similarly to the fixing belt A1, except that the final thickness of the conductive film was 1 μm was obtained.

[Fixing Belt A3]

A fixing belt A3 (embodiment 2) configured similarly to the fixing belt A1, except that the final thickness of the conductive film was 10 μm was obtained.

[Fixing Belt A4]

Figure 7:
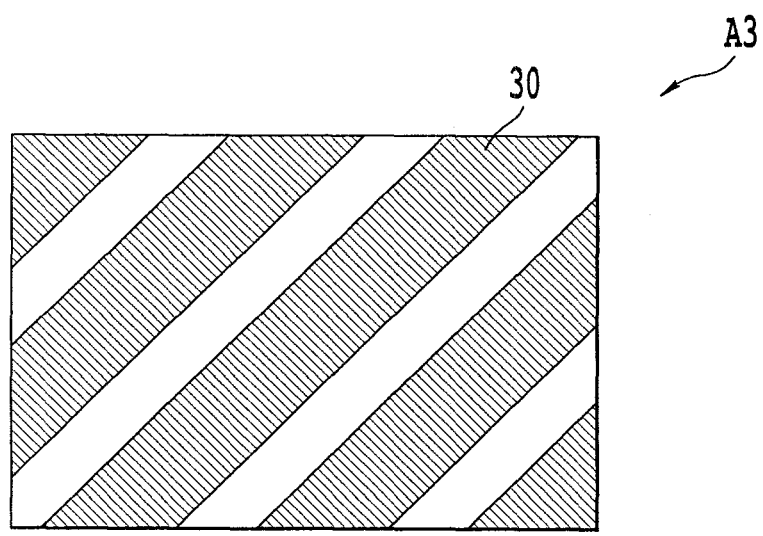
FIG. 7 is a perspective view showing a fixing belt on which a masking is performed to form bias striped application parts at an inclined angle.

A fixing belt A3 (embodiment 3) configured similarly to the fixing belt A1, except that a masking was performed such that the area provided with the conductive film was a two thirds of the one side of the sheet α, was obtained. More specifically, the masking was performed such that bias striped application parts 30 having a width of 30 mm and an inclined angle of 45 degrees were formed at an interval of 15 mm, and then the conductive film-material was applied by an air spray method so that the final thickness of the conductive film of the application parts was 5 μm (see FIG. 7).

[Fixing Belt A5]

A fixing belt A5 (comparative example 2) configured similarly to the fixing belt A4, except that the bias striped application parts having a width of 15 mm were formed at an interval of 30 mm, was obtained.

[Fixing Belt B]

A fixing belt B (comparative example 3) configured similarly to the fixing belt A1, except that the conductive film was not formed, was obtained.

[Fixing Belt C]

A fixing belt C (comparative example 4) was obtained as follows. A polyimide acid solution in which a conductive carbon (powder) was dispersed was applied on an inner surface of a cylindrical die having an inner diameter of 60 mm while the cylindrical die was rotated at 45 rpm. The polyamide solution was dried by heating at 100° C. for 30 minutes under a condition where a revolution of the die was set at 400 rpm. Then, the die was heated at 300° C. for 180 minutes. After the die was cooled, an endless polyimide belt (thickness of 75 μm) was obtained. Similarly to the production of the fixing belt A1, the primer treatment for the silicon rubber, the formation of the elastic layer, the primer treatment for the fluorine resin, and the formation of the separation layer were performed using the polyimide belt to produce the fixing belt C.

[Evaluation]

Each of the fixing belts A1 to A5, B and C obtained as mentioned above was put on a copy machine (Ipsio Calor 8100, Ricoh Co., LTD.). A surface potentiometer (MODEL 344, TREK Co. Ltd.) was put on each of the fixing belts to measure surface potentials during a passage of paper sheets. The surface potential was measured for a first paper sheet and a paper sheet after hundreds of thousands of paper sheets of passed continuously so that occurrences of electrostatic off-set images were observed and the fixing belts A1 to A5, B and C were evaluated. However, in some cases that the electrostatic off-set occurred in the first paper sheet, the following paper sheets were not evaluated at all.

In addition, a material usage or a total process time for each of the above fixing belts A1, B and C was also evaluated.

As an overall evaluation, it was judged from these results whether each of the fixing belts was suitable for practical use in terms of cost or performance. Tables 1 and 2 show the evaluation results by "poor" indicating that the fixing belt was not suitable for practical use, "medium" indicating that the fixing belt was not suitable for practical use although it is comparatively improved, and "good" indicating that the fixing belt was good for practical use.

TABLE 1

| Fixing Belt | First Paper | | After a hundred of thousands papers | | Total Evaluation |
| --- | --- | --- | --- | --- | --- |
| | Electrostatic off-set | Surface Potential | Electrostatic off-set | Surface Potential | |
| A1 | not occurred | −50 V~+50 V | no | −50 V~+50 V | good |
| A2 | slightly occurred | −200 V~+200 V | not considered | not considered | medium |
| A3 | not occurred | −50 V~+50 V | not occurred | −50 V~+50 V | good |
| A4 | not occurred | −100 V~+100 V | not occurred | −50 V~+50 V | good |
| A5 | slightly occurred | −500 V~+500 V | not considered | not considered | poor |
| B | occurred | −2000 V~+2000 V | occurred | −2000 V~+2000 V | poor |
| C | not occurred | −50 V~+50 V | not occurred | −50 V~+50 V | good |

TABLE 2

| Fixing Belt | Material Usage (g per Fixing Belt) | | Process Time (minutes) | Total Evaluation |
| --- | --- | --- | --- | --- |
| | polyimide in base element | conductive film | | |
| A1 | 10 | 2 | 60 | good |
| B | 10 | — | 45 | good |
| C | 200 | 10 | 210 | poor |

[Results of Evaluation]

Table 1 shows that the conductive film layer provided on the inner surface of the base element of the fixing belt made it possible to decrease the surface potential and to prevent the charging so that the occurrence of the electrostatic off-set was prevented, because the charging based on a capacitor principle of an electrical charge according to friction between the inner surface of the polyimide base element of the fixing belt and a heating roller or a fixing roller facing the inner surface of the polyimide base element may be removed by an existence of the conductive film layer. It was also found that the conductive film layer was required to be formed on two thirds or more of the inner surface of the polyimide base element.

On the other hand, Table 2 shows that the base element of the fixing belt according to en embodiment of the present invention allowed the material usage to be decreased and allowed the process for producing the base element to be considerably shortened compared to the conventional process for producing the base element provided with the conductive film.

[Fixing Belt D]

A polyimide film (Kapton®, 300H, DU PONT-TORAY CO., LTD.) having a thickness of 75 μm was cut to form finally a cylindrical body having a length of 320 mm and an external diameter of 60 mm so that the sheet was obtained. A thinned portion was formed on each of opposite surfaces of the opposite end portions (a length of 340 mm) of the sheet to be joined by grinding such that the thickness of thinned portions was 35 μm in a range of 10 mm from each of opposite ends of the sheet.

A silicon adhesive (TSE387, GE Toshiba Silicone Co., Ltd.) was applied to the two thinned portions to be joined. After, the thinned portions provided with the adhesive were superimposed with each other on the base member 241 having a gentle cylindrical convex surface. The thinned portions were joined by heating at 250° C. for 30 minutes while pressing the areas to be joined using the fixing plate having a cylindrical concave surface with a slightly gentler concave surface than the convex surface of the base member, so that an endless belt was obtained.

The conductive film-material which was the same as the material used for producing the fixing belt A was applied by the spray gun, while the endless belt was rotated on a flat surface, such that the final thickness of the conductive film-material was 5 μm. The material was dried at 120° C. to form the conductive film, so that the base element was obtained.

The elastic layer and the separation layer were provided on the base element similarly to the production of the fixing belt A so that the fixing belt D (embodiment) was obtained.

The fixing belt D was evaluated similarly to the above fixing belts and the same evaluation results as that of the fixing belt A were obtained.

INDUSTRIAL APPLICABILITY

Since the base element of the fixing belt according to an embodiment of the present invention allows easy formation of the conductive film at low cost, the fixing belt can preferably be used for an image forming apparatus such as an electrophotographic copier, a laser printer, a facsimile or the like.

According to an embodiment of the present invention, the fixing belt can have high durability. That is to say, polyphenylene sulfide (PPS) resin has an excellent heat-resistant property and polyphenylene sulfide molecules enter between polyimide molecules which have water-absorbing property. Therefore, since the conductive film has a low water-absorbing property when it is not used, the conductive film can adhere well on the base element (made of polyimide) so that the fixing belt can achieve long-lasting qualities.

The base element according to an embodiment of the present invention can have a sufficient heat resistance even in the forming process of the elastic layer of the silicone rubber, the fluorine rubber or the like.

According to the base element of an embodiment of the present invention, since the die for forming the base element is not required and the conductive film is easily produced, the sufficient charge-prevention effect is achieved at low cost.

According to the fixing belt of an embodiment of the present invention, the sufficient charge-prevention effect allows high electrostatic off-set to be prevented.

According to the fixing device or the image forming apparatus of an embodiment of the present invention, images without defects can be obtained at low cost, because the inexpensive and sufficient charge-prevention fixing belt is used.

What is claimed is:

1. A base element for a fixing belt, comprising a sheet comprising a heat-resistant resin,
   wherein the sheet has opposite end portions that are joined in an endless state,
   a conductive film layer of a thickness of 3 to 15 μm comprises striped application parts covering at least two thirds but not the entirety of an inner surface of the sheet having opposite end portions joined in an endless state,
   the striped application parts comprise a conductive material sprayed on the sheet,
   the striped application parts of the conductive film layer are inclined to a rotation direction of the belt, and
   the conductive film layer satisfies a following relationship:

$$2/3 \leq X/(X+Y) < 1,$$

where X represents a total area of the striped application parts of the conductive film layer, and Y represents a total area of intervals between the striped application parts of the conductive film layer.

2. The base element according to claim 1, wherein the heat-resistant resin is a polyimide resin.

3. The base element according to claim 1, wherein the conductive film layer comprises a polyimide, a polyphenylene sulfide, and a conductive carbon.

4. The base element according to claim 1, wherein the opposite end portions of the sheet are joined with a silicon adhesive.

5. The base element according to claim 1, wherein a thinned portion is formed on each of the opposite end portions of the sheet.

6. The base element according to claim 5, wherein each of the thinned portions is formed in a stepped shape.

7. The base element according to claim 5, wherein each of the thinned portions is formed in a tapered shape.

8. The base element of claim 1, wherein the conductive film layer has a thickness of 3 μm.

9. A fixing belt comprising the base element of claim 1, an elastic layer, and a separation layer.

10. A fixing device comprising the fixing belt of claim 9.

11. An image-forming apparatus comprising the fixing device of claim 10.

12. A method for producing the base element according to claim 1, the method comprising:
    joining opposite end portions of the sheet to form an endless belt; and
    applying a conductive film-material to an inner surface of the endless belt to form the conductive film layer while rotating the endless belt.

13. The method according to claim 12, wherein the sheet comprises a heat-resistant resin that is a polyimide resin.

14. The method according to claim 12, further comprising forming thinned portions on opposite sides of the opposite end portions of the sheet before joining the opposite end portions of the sheet to form the endless belt.

15. The method according to claim 12, further comprising forming areas on opposite sides of the opposite end portions of the sheet before joining the opposite end portions of the sheet to form the endless belt.

16. The method according to claim 14, wherein each of the thinned portions is formed in a stepped shape.

17. The method according to claim 14, wherein each of the thinned portions is formed in a tapered shape.

18. A method for producing the base element of claim 1, the method comprising:
    applying a conductive film-material to a surface of the sheet; and
    joining opposite end portions of the sheet to form an endless belt so that the surface provided with the conductive film-material is disposed on an inner side of the endless belt.

19. The method according to claim 18, wherein the sheet comprises a heat-resistant resin that is a polyimide resin.

20. The method according to claim 18, further comprising, before the joining opposite end portions of the sheet to form an endless belt, forming thinned portions on opposite sides of the opposite end portions of the sheet.

* * * * *